United States Patent [19]
Zierhut

[11] Patent Number: 5,943,366
[45] Date of Patent: Aug. 24, 1999

[54] METHOD OF GENERATING A.C. INFORMATION FOR A BUS SYSTEM, AND TRANSMISSION UNIT FOR CARRYING OUT THE METHOD

[75] Inventor: Hermann Zierhut, deceased, late of Neutraubling, Germany, by Ingeborg Zierhut, heir

[73] Assignee: Siemens AG, Munich, Germany

[21] Appl. No.: 08/930,358

[22] PCT Filed: Mar. 13, 1996

[86] PCT No.: PCT/EP96/01070

§ 371 Date: Feb. 6, 1998

§ 102(e) Date: Feb. 6, 1998

[87] PCT Pub. No.: WO96/31012

PCT Pub. Date: Oct. 3, 1996

[30] Foreign Application Priority Data

Mar. 30, 1995 [EP] European Pat. Off. .............. 95104725

[51] Int. Cl.[6] ............................. H03K 7/08; H03K 9/08; H04B 3/00
[52] U.S. Cl. ........................... 375/238; 375/258; 327/34; 327/174; 327/178; 332/110
[58] Field of Search ..................................... 375/219, 220, 375/238, 239, 257, 258; 332/109, 110, 111, 106; 327/31, 34, 174, 177, 178, 108, 111; 370/205, 212; 326/87, 92; 340/310, 310 R

[56] References Cited

U.S. PATENT DOCUMENTS

| 5,020,154 | 5/1991 | Zierhut | 332/108 |
| 5,546,419 | 8/1996 | Zierhut | 375/257 |

FOREIGN PATENT DOCUMENTS

| 0 365 696 | 5/1990 | European Pat. Off. . |
| 0 379 901 | 8/1990 | European Pat. Off. . |
| 0 379 902 | 8/1990 | European Pat. Off. . |
| 0 487 874 | 6/1992 | European Pat. Off. . |

*Primary Examiner*—Don N. Vo
*Assistant Examiner*—Albert Park
*Attorney, Agent, or Firm*—Kenyon & Kenyon

[57] ABSTRACT

Method and device for generating bit information in a subscriber station of a bus system, in particular of the bus of the EIBA, essentially symmetrical AC voltage information being superposed as bit information on a DC voltage of the bus in that a DC voltage potential (19) of a line under inductive loading (9) is pulled, in each case in an active pulse (20) to the potential of another line and an equalizing pulse (22, 23) is formed with subsequent energy recovery. It is provided that the active pulse (20) of the bit information at a bit frequency is formed from individual pulses (17) of higher frequency.

5 Claims, 2 Drawing Sheets

METHOD OF GENERATING A.C. INFORMATION FOR A BUS SYSTEM, AND TRANSMISSION UNIT FOR CARRYING OUT THE METHOD

FIELD OF THE INVENTION

The present invention is directed to a transmission stage for a transceiver of a subscriber station of a bus system, and in particular of a bus of the European Installation Bus Association, EIBA.

BACKGROUND INFORMATION

Essentially symmetrical AC voltage information is superposed as bit information on a DC voltage of the bus. In a line that is under an inductive load, a DC voltage potential of the line is pulled, in,each case in an active pulse, to the potential of another line. Subsequently, an equalizing pulse is formed for the purpose of energy recovery. Bus couplers of this type are discussed in such references as European Published Applications 0 365 696, 0 379 901, and 0 379 902. Bus couplers of this type usually operate with transformers. In such systems, the DC voltage potential of a line that is under an inductive load is pulled, in each case in an active pulse, to the potential of another line. In the transmitter of a EIB transceiver, the bit pulse on the bus is generated in such a way that an active pulse having an amplitude of about 7 volts is superposed in each case on the bus DC voltage of about 24 volts, as described in European Published Patent Application 0 365 696. This arrangement operates with a turns ratio of about 3:1.

SUMMARY OF THE INVENTION

An object of the present invention is to provide a transmission stage that operates without transformers.

According to the present invention, the active pulse of the bit information at a bit frequency is in this case formed from individual pulses of higher frequency. Specifically, the active pulse of the bit information at a bit repetition rate is obtained in a generator for generating individual pulses of higher frequency. In this case, the generator, in combination with a capacitor of an internal on-board electrical supply, is designed as a high-frequency step-up regulator. The voltage source for the step-up regulator is the bus, and the regulating criterion for the step-up regulator is the voltage dip during the active pulse. In an advantageous manner, use is made of a very high frequency, relative to the bit repetition rate, with the result that the transformer can be reduced to a very small inductance in the form of an inductor.

The transmission stage for the transceiver of the subscriber station of a bus system therefore operates with a generator for generating individual pulses of higher frequency than the bit repetition rate. The voltage drop during an active pulse is in this case simulated by high-frequency current pulses in a switched-mode power supply or by means of a transmission transistor, with ripple but in principle with a rectangular waveform. The higher the frequency of the individual pulses, the better the simulation of a rectangular waveform. The arrangement operates with a generator which is designed as a high-frequency step-up regulator.

European Published Patent Application 0 487 874 describes a multiplex device without energy recovery, which operates with a plurality of messages, and in which a bit pulse is not simulated.

In contrast, with the transmission stage of the present invention, energy recovery is carried out by the operation of the step-up switched mode regulator, which is designed in such a way that instead of regulating the output voltage, it regulates the dip in the input voltage. In other words, the active pulse is regulated in terms of its amplitude. By doing this, the input capacitance in comparison with a customary step-up switched-mode regulator can be reduced toward zero or even right down to zero. This is particularly advantageous because the bus should not be capacitively loaded.

DETAILED DESCRIPTION

Figure 1:
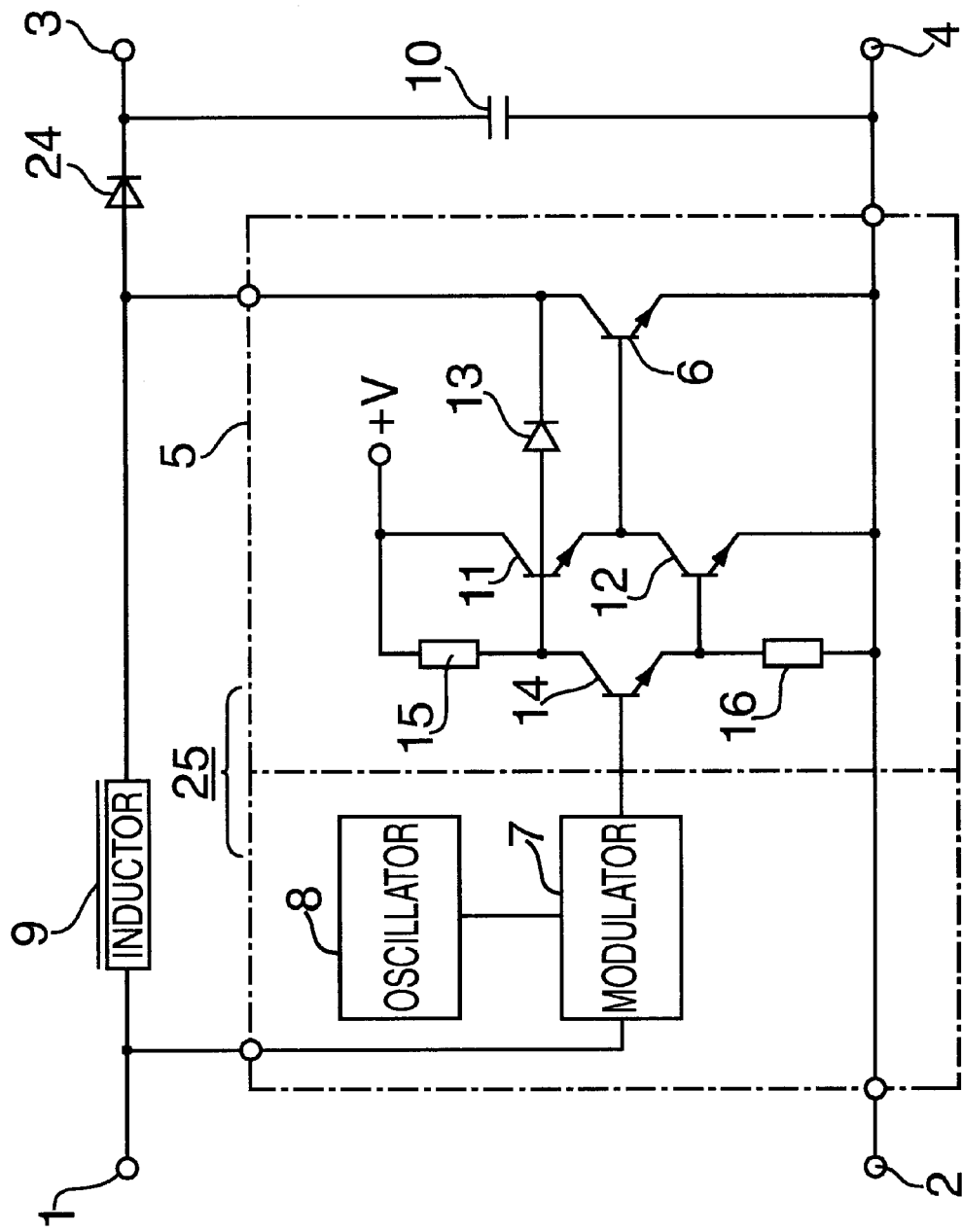
FIG. 1 illustrates a transmission stage.

The transmission stage according to FIG. 1 is connected by terminals 1 and 2 to a two-conductor bus, it being possible to connect further subscriber stations in parallel with this. An on-board electrical supply or an auxiliary voltage source can be connected to terminals 3 and 4 of the transmission stage. The transmission stage has a switched-mode power supply 5 with a transmission valve, which may comprise, for example, a transmission transistor 6. The switched-mode power supply 5 is connected to a pulse width modulator 7, to which an oscillator 8 is connected. Oscillator 8 can advantageously be tuned to the desired switching frequency of the transmission transistor 6.

The operation of the transmission circuit of FIG. 1 will now be described.

The bus DC voltage, on which the bit pulses of the information are to be superposed, is applied to the terminals 1 and 2. When the transmission transistor 6 is switched on, the entire bus DC voltage is applied via an inductor 9. A current begins to flow, rising rapidly in accordance with the driving bus DC voltage and the inductance of the inductor 9. The current at the terminals 1 and 2 causes a corresponding voltage drop. If a cycle, which is predetermined by the oscillator 8 in accordance with the oscillator frequency, is concluded, then the transmission transistor 6 is switched off and the energy stored in the inductor 9 flows away into a capacitor 10. The energy assigned to the individual current pulses is gradually charged into the capacitor 10 during the energy recovery.

The transmission transistor 6 ensures that the transmission stage operates in a satisfactory manner. The transmission transistor 6 must switch cleanly at high frequency without relatively large intrinsic losses. Correspondingly, in the case of a transmission transistor 6, saturation is to be avoided, requiring this transistor to be turned on and off in a low-impedance manner. According to the present invention, a drive circuit of transmission transistor 6 is designed as a push-pull stage, in which the transistor 12 of transistor pair 11 and 12 is switched off by means of a diode 13 when the collector voltage of the transmission transistor 6 falls below a specific voltage. Transistors 11 and 12 are connected in series in a push-pull manner. In comparison with a customary step-up regulator, it should be stressed that its regulating criterion is not the output voltage, which is the usual case, but rather the dip in the input voltage, in other words the amplitude of the active pulse. It has been shown, that this ensures good simulation of rectangular-waveform information.

As FIG. 1 shows, the base of the transmission transistor 6 is connected, as a control electrode, to the transistors 11 and 12, which are arranged in series and operate in a push-pull manner. The connection point between transistor 6 and transistors 11 and 12 is located between the transistors 11 and 12. The control electrodes, in each case the base, of the transistors 11 and 12 operating in a push-pull manner are connected to the collector and emitter, respectively, of a transistor 14. Transistor 14 is in turn connected via inductances 15 and 16 to the positive transmission voltage. The pulse width modulator 7, which is connected to the oscillator 8, operates on the base of the transistor 14. The emitter of the transistor 11 is connected to the base of the transmission transistor 6, and the base of the transistor 11 is connected via a diode 13 to the collector of the transmission transistor 6.

Figure 2:
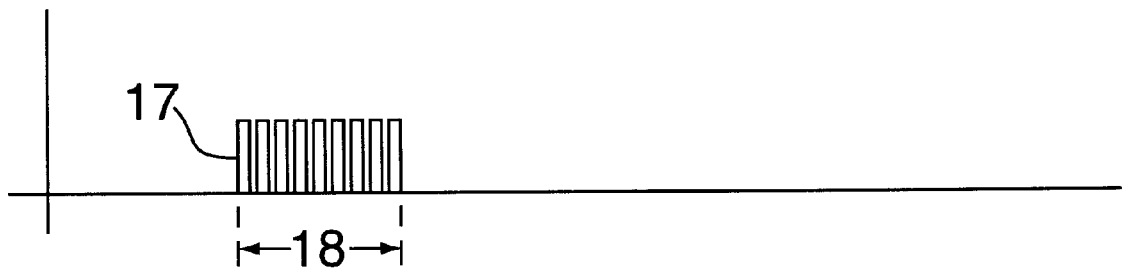
FIG. 2 illustrates a current profile in a transmission valve of the transmission stage during an active pulse.
Figure 3:
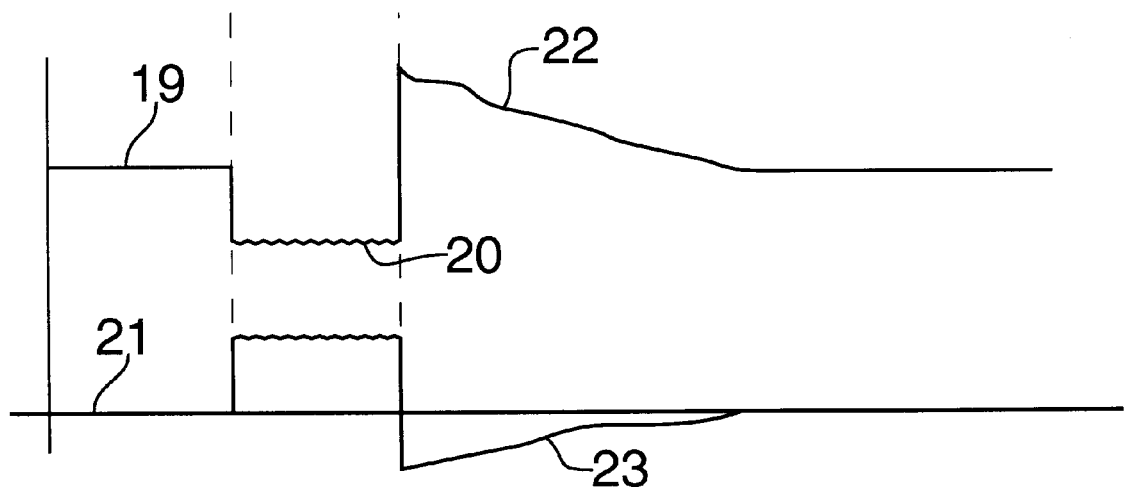
FIG. 3 represents, in the upper curve profile, the bus voltage during superposition by an active pulse and, underneath that, the bus current during the superposition by an active pulse, together with subsequent energy recovery.

When the transmission transistor 6 is switched on in accordance with the oscillator frequency of the oscillator 8, it conducts individual pulses 17 in a manner illustrated in FIG. 2. Pulses 17 have a significantly higher frequency than the frequency of a bit pulse 18. As illustrated by FIG. 3, the bus voltage 19 drops correspondingly in each case during an active pulse 20, which has a degree of ripple in accordance with the individual pulses 17. The higher the frequency of the individual pulses 17, the better the active pulse 20 is simulated with a rectangular waveform. When the frequency of the individual pulses 17 of the switched-mode power supply 5 is about 50 times the frequency of the train of bit pulses, the ripple is negligible. A bus current 21 according to the lower illustration of FIG. 3 is changed in accordance with the profile of the bus voltage 19. Equalizing pulses 22 and 23 correspond to the energy recovery.

The pulse width modulator 7 in each case regulates the period of time during which the transmission transistor 6 is closed or switched on. The closed period ends when the necessary amplitude for the bit pulse has been reached. At that point, the amplitude is maintained at a constant level independently of the bus voltage. The amplitude of the active pulse is advantageously regulated and maintained by the pulse width modulator 7 at a predetermined, constant value, independently of the respective bus voltage. Furthermore, the pulse width modulator 7 includes a drive circuit for forming an integral of the voltage amplitude during the active pulse.

It should be appreciated that the components in the exemplary embodiment according to FIG. 1 can be replaced by inverse components, in which case the cathode and anode of the diodes will then have to be interchanged.

Returning to FIG. 1, the capacitor 10 of the internal on-board electrical supply, or of an auxiliary voltage source, is connected to the collector of the transmission transistor 6 via a valve 24, which may comprise a diode. The valve 24 is in the on state when the transmission transistor 6 is in the off state, and the valve 24 is in the off state when the transmission transistor 6 is in the on state.

The measures that have been outlined enable the generator 25 comprising switched-mode power supply 5, pulse width modulator 7 and oscillator 8, and the entire transmission stage including the inductor 9 and further assigned components to be designed as part of an integrated circuit.

What is claimed is:

1. A transmission stage for a transceiver of a subscriber station of a bus system having at least a first line and a second line for superposing substantially symmetrical AC voltage information as bit information on a DC voltage of the bus system, comprising:

a high-frequency step-up regulator including:
  a generator for generating pulses at a predetermined frequency; and
  a capacitor coupled to the generator;
and
an inductive load, coupled to the generator and the capacitor via at least the first line, for introducing an inductive loading into a DC voltage potential of the first line,
wherein the DC voltage potential is pulled, in an active pulse of the bit information, to a potential of the second line, wherein an equalizing pulse is formed with subsequent energy recovery, wherein the active pulse of the bit information at a bit repetition rate is obtained in the generator, wherein the bus system comprises a voltage source for the step-up regulator, and wherein a regulating criterion for the step-up regulator includes a voltage change of a voltage of the bus system during the active pulse.

2. The transmission stage according to claim 1, wherein the generator comprises:
a transmission transistor operating as a transmission valve;
a first drive circuit coupled to the transmission transistor, the first drive circuit including a first transistor and a second transistor, the first transistor and the second transistor being connected in series to one another in a push-pull arrangement;
a pulse width modulator connected to the first drive circuit;
an oscillator connected to the pulse width modulator, the oscillator being set to the predetermined frequency.

3. The transmission stage according to claim 2, wherein the pulse width modulator includes a second drive circuit for forming an integral of an amplitude of the voltage of the bus system during the active pulse.

4. The transmission stage according to claim 2, wherein the capacitor is connected to a collector of the transmission transistor via a diode, wherein the diode is in an on state when the transmission transistor is in an off state, and wherein the diode is in an off state when the transmission transistor is in an on state.

5. The transmission stage according to claim 1, wherein the transmission stage is arranged as part of an integrated circuit.

* * * * *